United States Patent
Donaldson

(10) Patent No.: US 9,407,982 B2
(45) Date of Patent: Aug. 2, 2016

(54) MEDIA/COMMUNICATIONS SYSTEM

(71) Applicant: PANASONIC AVIONICS CORPORATION, Lake Forest, CA (US)

(72) Inventor: Mark Donaldson, Bussigny-pres-Lausanne (CH)

(73) Assignee: Panasonic Avionics Corporation, Lake Forest, CA (US)

(*) Notice: Subject to any disclaimer, the term of this patent is extended or adjusted under 35 U.S.C. 154(b) by 59 days.

(21) Appl. No.: 14/387,509

(22) PCT Filed: Mar. 21, 2013

(86) PCT No.: PCT/EP2013/055954
§ 371 (c)(1),
(2) Date: Sep. 23, 2014

(87) PCT Pub. No.: WO2013/143971
PCT Pub. Date: Oct. 3, 2013

(65) Prior Publication Data
US 2015/0055785 A1    Feb. 26, 2015

(30) Foreign Application Priority Data

Mar. 26, 2012   (GB) .................................. 1205275.9

(51) Int. Cl.
| H04R 1/10 | (2006.01) |
| H04R 29/00 | (2006.01) |
| H04R 5/033 | (2006.01) |
| B64D 11/00 | (2006.01) |

(52) U.S. Cl.
CPC ............ *H04R 1/1091* (2013.01); *H04R 1/1083* (2013.01); *H04R 5/033* (2013.01); *H04R 29/00* (2013.01); *B64D 11/0015* (2013.01); *H04R 2201/107* (2013.01); *H04R 2420/01* (2013.01); *H04R 2420/03* (2013.01); *H04R 2420/05* (2013.01); *H04R 2460/01* (2013.01); *H04R 2499/13* (2013.01)

(58) Field of Classification Search
None
See application file for complete search history.

(56) References Cited

U.S. PATENT DOCUMENTS

| 6,249,913 B1 * | 6/2001 | Galipeau ............ H04N 7/17318 348/E5.002 |
| 7,570,971 B2 | 8/2009 | Benning et al. |

(Continued)

FOREIGN PATENT DOCUMENTS

| DE | 102009008550 A1 | 8/2010 |
| EP | 2 226 902 A2 | 9/2010 |

(Continued)

OTHER PUBLICATIONS

PCT, International Search Report and Written Opinion, PCT/EP2013/055954, Sep. 26, 2013.

(Continued)

*Primary Examiner* — Brenda Bernardi
(74) *Attorney, Agent, or Firm* — Orrick, Herrington & Sutcliffe LLP

(57) ABSTRACT

A system for providing media and/or communications data to a plurality of users, the system comprising: a plurality of headphones; and a server system for providing audio data to each of the plurality of headphones; wherein each headphone comprises a processor module for allowing two-way digital communication between the headphone and the server system.

20 Claims, 2 Drawing Sheets

(56) References Cited

U.S. PATENT DOCUMENTS

Figure 1:
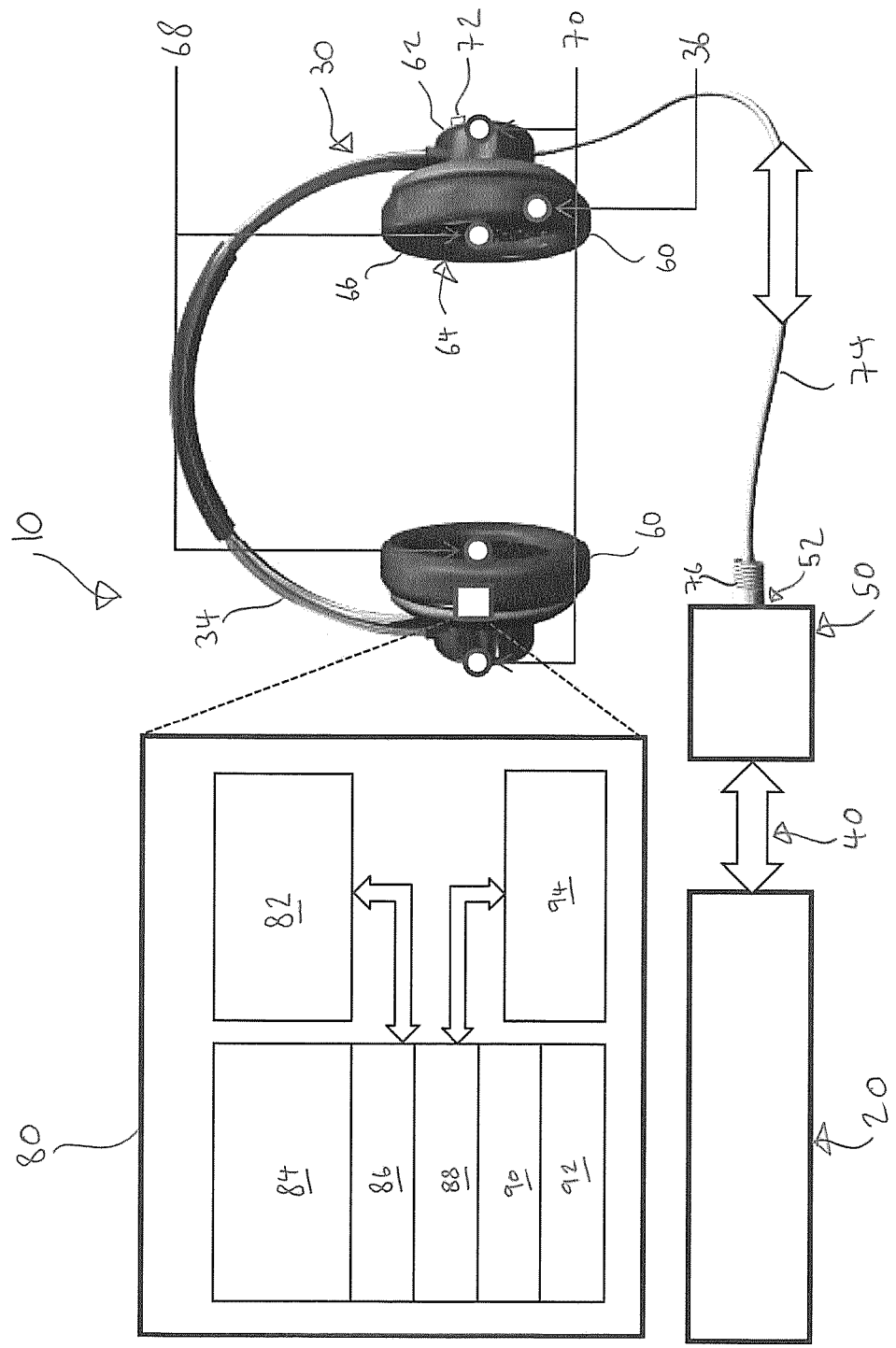

| | | | |
|---|---|---|---|
| 7,602,923 B2* | 10/2009 | Lee | H04R 29/00 381/108 |
| 7,680,490 B2 | 3/2010 | Bloebaum et al. | |
| 7,738,434 B1 | 6/2010 | Reuss et al. | |
| 7,912,020 B2 | 3/2011 | Khasawneh et al. | |
| 7,996,496 B2 | 8/2011 | Haartsen et al. | |
| 8,009,874 B2 | 8/2011 | Brown | |
| 8,055,307 B2 | 11/2011 | Rahman et al. | |
| 2002/0045484 A1 | 4/2002 | Eck et al. | |
| 2002/0059614 A1 | 5/2002 | Lipsanen et al. | |
| 2004/0107271 A1 | 6/2004 | Ahn et al. | |
| 2005/0020207 A1 | 1/2005 | Hamada et al. | |
| 2005/0071375 A1 | 3/2005 | Houghton et al. | |
| 2005/0130744 A1 | 6/2005 | Eck et al. | |
| 2005/0147229 A1 | 7/2005 | King | |
| 2005/0216938 A1 | 9/2005 | Brady et al. | |
| 2005/0265316 A1 | 12/2005 | Liu et al. | |
| 2005/0272485 A1 | 12/2005 | Boykins et al. | |
| 2006/0072919 A1 | 4/2006 | Edelist | |
| 2006/0107295 A1* | 5/2006 | Margis | H04N 7/163 725/81 |
| 2006/0141930 A1* | 6/2006 | Keen | H04B 7/18508 455/12.1 |
| 2006/0142002 A1* | 6/2006 | Funderburk | B64D 11/0015 455/431 |
| 2006/0143660 A1* | 6/2006 | Logan | H04N 21/41422 725/76 |
| 2006/0143662 A1* | 6/2006 | Easterling | H04N 5/50 725/76 |
| 2006/0234700 A1* | 10/2006 | Funderburk | H04H 20/62 455/431 |
| 2006/0270373 A1 | 11/2006 | So | |
| 2006/0271967 A1 | 11/2006 | So | |
| 2007/0044126 A1 | 2/2007 | Mitchell | |
| 2007/0049198 A1 | 3/2007 | Walsh et al. | |
| 2007/0283033 A1 | 12/2007 | Bloebaum et al. | |
| 2008/0040446 A1 | 2/2008 | Meyer | |
| 2008/0075065 A1 | 3/2008 | Reuss et al. | |
| 2008/0080705 A1 | 4/2008 | Gerhardt et al. | |
| 2008/0157997 A1* | 7/2008 | Bleacher | G08C 17/02 340/4.37 |
| 2008/0189748 A1* | 8/2008 | Bleacher | H04N 7/17318 725/76 |
| 2008/0194209 A1 | 8/2008 | Haupt et al. | |
| 2009/0007194 A1* | 1/2009 | Brady, Jr. | H04N 7/10 725/77 |
| 2009/0281809 A1 | 11/2009 | Reuss | |
| 2010/0115149 A1 | 5/2010 | Ewer | |
| 2010/0158264 A1* | 6/2010 | Marten | H04R 1/1041 381/74 |
| 2010/0186051 A1 | 7/2010 | von Doenhoff et al. | |
| 2010/0232618 A1* | 9/2010 | Haartsen | H04L 1/0003 381/80 |
| 2010/0235866 A1* | 9/2010 | Jangid | H04N 7/17336 725/76 |
| 2010/0271983 A1 | 10/2010 | Bryant | |
| 2011/0003505 A1* | 1/2011 | Greig | H01R 13/514 439/540.1 |
| 2011/0047580 A1* | 2/2011 | Kurita | H04N 7/163 725/77 |
| 2011/0103605 A1 | 5/2011 | Killion et al. | |
| 2011/0107415 A1* | 5/2011 | Shen | G06F 21/445 726/19 |
| 2011/0219409 A1* | 9/2011 | Frisco | H04N 7/18 725/77 |
| 2011/0228947 A1 | 9/2011 | Killion et al. | |
| 2012/0014530 A1* | 1/2012 | Yamkovoy | H04M 1/6066 381/58 |
| 2012/0039048 A1* | 2/2012 | Mondragon | B60R 11/0235 361/733 |
| 2012/0328116 A1* | 12/2012 | Bidmead | H04R 29/004 381/59 |

FOREIGN PATENT DOCUMENTS

| | | |
|---|---|---|
| EP | 2 268 024 A1 | 12/2010 |
| FR | 2 951 437 B1 | 4/2011 |
| JP | 2010-041422 A | 2/2010 |
| JP | 2010-154173 A | 7/2010 |
| WO | WO 98/33172 A1 | 7/1998 |
| WO | WO 03/030492 A2 | 4/2003 |
| WO | WO 2005/079310 A2 | 9/2005 |
| WO | WO 2005/125207 A2 | 12/2005 |
| WO | WO 2006/075275 A1 | 7/2006 |
| WO | WO 2006/076369 A1 | 7/2006 |
| WO | WO 2008/070005 A2 | 6/2008 |
| WO | WO 2008/113822 A2 | 9/2008 |
| WO | WO 2008/134673 A1 | 11/2008 |
| WO | WO 2009/112092 A1 | 9/2009 |
| WO | WO 2011/146429 A1 | 11/2011 |

OTHER PUBLICATIONS

Akl et al., A New Wireless Architecture for In-Flight Entertainment Systems Inside Aircraft Cabin, International Journal on Advances in Networks and Services, vol. 4, No. 1 & 2, 2011, pp. 159-175.

Akl et al., Investigating Several Wireless Technologies to Build a Heterogeneous Network for the In-Flight Entertainment System Inside an Aircraft Cabin, The Sixth International Conference on Wireless and Mobile Communications (ICWMC), 2010, 6 pages.

Akl et al., Key Factors in Designing In-Flight Entertainment Systems, Recent Advances in Aircraft Technology, Chapter 15, Feb. 2012.

Chong et al., Integrated Headsets Using the Adaptive Hybrid Active Noise Control System, ICICS—2005 Fifth International Conference on Information, Communications and Signal Processing, Dec. 2005, pp. 1324-1328.

Karlin, Take Off, Plug In, Dial Up, IEEE Spectrum, Aug. 2001, 7 pages.

Kletschkowski et al., Active Noise Control in Aircraft Cabins, Acoustic Bulleting, vol. 35, No. 5, Sep./Oct. 2010, 7 pages.

Lui-Kwan, In-Flight Entertainment: The Sky's the Limit, Entertainment Computing, vol. 33 No. 10, Oct. 2000, pp. 98-101.

Milosevic et al., Active Noise Control, University of Applied Sciences Rapperswil HSR (Switzerland)—Diploma Thesis, Dec. 2005, pp. 26, 35, and 36.

Potega, Advanced Infrared (AIR): Intra-Cabin Wireless Data Network, Proceedings of the 17th DASC Digital Avionics Systems Conference, Oct./Nov. 1998, pp. G15-1-G15-8.

Rafaely et al., Audiometric Ear Canal Probe with Active Ambient Noise Control, IEEE Transactions on Speech and Audio Processing, vol. 4, No. 3, May 1996, pp. 224-230.

Rafaely, Active Noise Reducing Headset—An Overview, Inter-Noise—The 2001 International Congress and Exhibition on Noise Control Engineering, Aug. 2001, pp. 589-598.

* cited by examiner

MEDIA/COMMUNICATIONS SYSTEM

The present invention relates to a system for providing media and/or communications data to a plurality of users and particularly but not exclusively to an In-Flight Entertainment and Communications (IFEC) system.

IFEC systems providing on-demand media and in-flight connectively are well known in the art with audio being supplied to passengers by headphones connected via a Remote Jack Unit (RJU) or "Jack Module" typically installed in the armrest of an aircraft seat.

There are three types of headphone configurations used on modern aircraft: 1) standard stereo audio provided by low cost headphones typically connected to an RJU via ARINC Type A1/B1 or A2/B2 connectors; 2) powered noise-cancelling audio provided by higher grade headphones that incorporate electronics for active noise cancelling powered by a 12V DC supply and typically connected to an RJU configured to accept ARINC Type C1 or C2 connectors; and 3) RJU provided noise-cancelling audio in which high grade headphones that incorporate sensors to measure ambient noise connect to an RJU configured to accept ARINC Type D1 or D2 connectors with electronics housed in the RJU itself processing the noise signals from the headphone to enable active noise cancelling functionality.

The quality of sound experienced by passengers using IFEC systems depends very much on: a) the quality of the headphone design and specifically its driver, electroacoustics and physical interface with the ear; b) the ability of the headphone to counter or mitigate ambient cabin noise (through passive and/or active means); and c) the audio signal path between the audio source in the IFEC system and the headphone driver.

The present applicant has identified the need for an improved IFEC system in which limitations associated with the prior art are overcome or at least alleviated.

In accordance with a first aspect of the present invention, there is provided a system (e.g. in-flight entertainment system) for providing media and/or communications data to a plurality of users, the system comprising: a plurality of earphone devices; and a server system for providing audio data to each of the plurality of earphone devices; wherein each earphone device comprises a processor module for allowing two-way digital communication between the earphone device and the server system.

In one embodiment, the server system comprises a central server in communication with a plurality of local units acting as clients to the central server (e.g. local units associated with a sub-set of the plurality of users). In one embodiment, the central server and plurality of earphone devices are configured to allow direct digital communication therebetween. In another embodiment, the plurality of earphone devices are configured to communicate with the local units. For example, the plurality of earphone devices may be configured to communicate indirectly with the central server via a local unit connected between the central sever and an earphone device. In one embodiment the earphone devices may be configured to allow both direct communication with the central server and communication with the local units.

In one embodiment, each earphone device is associated with an identifier (e.g. unique identifier) for allowing the server system to direct communications to a selected one of the plurality of earphone devices. The identifier may be established by the server system or pre-set in each earphone device. In the case of a server system comprising a plurality of local units in communication with a central server, the local unit corresponding to an earphone device or the central server may establish the identifier or obtain the identifier from the earphone device itself.

In one embodiment, digital communication between each earphone device and server system is achieved over a wired or wireless connection (or a combination thereof).

In one embodiment, each earphone device comprises a cable for electrically connecting the processor module of the earphone device to the server system via an electro-mechanical interface (e.g. a Remote Jack Unit (RJU) located on or near a user's seat and configured to receive a connector on the end of the cable).

In one embodiment, digital communication between each earphone device and the server system is duplex or semi (e.g. time-shared) duplex over a connection (e.g. wired or wireless or a combination thereof) supporting two-way transmission of digital data (e.g. audio, user's voice, control, status and switching data).

In one embodiment, each earphone device comprises at least one circumaural or supra-aural earphone of the type used in headphones or at least one in-ear or in-the-canal earphone. In one embodiment, each earphone device comprises a pair (e.g. stereo pair) of earphones. In one embodiment the pair of earphones are connected by a headband to form a pair of headphones.

In one embodiment, the processor module of each earphone device is housed within an earpiece (e.g. cup of a circumaural or supra-aural earphone) of the earphone device or provided as part of the cable connecting the processor module to the server system (e.g. provided as part of an RJU connector forming one end of the cable or at a location along the cable between the RJU connector and earpiece).

In one embodiment, each earphone device comprises an audio processing component.

In one embodiment, each earphone device is configured to convert digital audio data received from the server system into an analogue sound output. In one embodiment, the audio processing component comprises a conversion function configured to convert the digital audio data into an analogue audio signal (e.g. for reproduction as an audible sound output by an electro-acoustic driver of the earphone device). Each earphone device may be further configured to incorporate audio data generated by other functions of the processor module (as defined below) into the analogue sound output.

In one embodiment, each earphone device comprises at least one sensing microphone (e.g. one sensing microphone per ear) and the audio processing component comprises an Active Noise Cancellation (ANC) function for processing signals received from the at least one sensing microphone. The ANC function may implement feedback, feed-forward or hybrid feedback/feed-forward methods (e.g. with one internal sensing microphone per ear and one external sensing microphone per ear).

In one embodiment, each earphone device comprises at least one sensing microphone (e.g. one sensing microphone per ear) for sensing ambient sound around the earphone device and the audio processing component comprises a monitoring (e.g. binaural monitoring) function configured to provide an audio signal based on sound measurements obtained from the at least one sensing microphone (e.g. to allow a user to monitor external noise whilst wearing the earphone device). In one embodiment, the monitoring function is configured to combine the sound measurements obtained from the at least one sensing microphone with an audio signal received from the server system.

In another embodiment, the audio processing component comprises a binaural synthesis function configured to synthesize a virtual binaural (virtual sound) reproduction from digital audio data provided by the server system.

In one embodiment, the processor module of each earphone device comprises a management component configured to receive control data from the server system. In one embodiment, the management component is configured to alter a configuration of the earphone device in response to the received control data (e.g. alter control or audio processing settings such as filtering settings in an ANC program).

In one embodiment, the processor module of each earphone device comprises a status monitoring component configured to transmit status information from the earphone device to the server system.

In one embodiment, the status monitoring component is configured to direct status information from the earphone device to the server system in response to a status query received from the server system. In another embodiment the status monitoring component is configured to monitor the condition of the earphone device and to provide a status report to the server system in the event of a change in condition (e.g. if a fault is identified). The status monitoring component may be further configured to identify and diagnose the fault condition of the earphone device and provide fault information to the server system. The fault information may be provided in a proprietary or industry standard format such as BITE ("Built-In Test Equipment").

In one embodiment, each earphone device includes a control switch or sensor for providing an input signal and the processor module comprises a control component configured to transmit a digital control signal (e.g. corresponding to a programmed function) from the earphone device to the server system in response to the input signal.

In one embodiment, each earphone device comprises a microphone for detecting a user's speech and the processor module includes a telephony component configured to digitize detected speech for digital transmission to the server system to allow for two-way voice communication (e.g. headset functionality). In the case of an IFEC system, this embodiment may allow two-way voice communication between individual passengers or a passenger and crew, or may allow for communication outside of the server system (e.g. to the ground) where the server system supports external communication.

In one embodiment, the processor module of each earphone device is programmable (e.g. a programmable microchip including a programmable software/firmware component). In this way, each component of the processor module may be updated or upgraded to provide new functionality (e.g. future audio processes) or improvements to current functionality. In one embodiment, updates or upgrades to the processor module are uploaded from the server system.

In one embodiment, the server system is configured to additionally provide an analogue signal (e.g. analogue audio signal or other one way analogue communication signal) to the plurality of earphone devices.

In one embodiment, the server system is configured to switch between transmitting a digital signal and transmitting an analogue audio signal. In one embodiment, the analogue audio signal is transmitted over a wired connection used to transmit digital signals between the server system and earphone devices.

In one embodiment, the server system is configured to switch between transmitting a digital signal to transmitting an analogue audio signal to an earphone device in response to a failed communication handshaking procedure.

The server system may be configured to maintain the analogue audio signal output until the earphone device is disconnected or until such time as the handshaking procedure is successful.

In one embodiment the server system connects to each earphone device through a mechanical connector configured to support both digital two-way communication and analogue one way communication using the same set of electrical conductors.

In accordance with a second aspect of the present invention, there is provided earphone apparatus comprising a processor module for allowing two-way digital communication between the earphone device and a server system.

In one embodiment, the earphone apparatus is associated with an identifier (e.g. unique identifier) for allowing the server system to selectively direct communications to the earphone apparatus. The identifier may be established by the server system or pre-set in the earphone apparatus.

In one embodiment, digital communication between the earphone apparatus and server system is achieved over a wired or wireless connection (or a combination thereof).

In one embodiment, the earphone apparatus comprises a cable for electrically connecting the processor module to the server system via an electro-mechanical interface (e.g. a Remote Jack Unit (RJU) located on or near a user's seat and configured to receive a connector on the end of the cable).

In one embodiment, digital communication between the earphone apparatus and the server system is duplex or semi (e.g. time-shared) duplex over a connection (e.g. wired or wireless or a combination thereof) supporting two-way transmission of digital data (e.g. audio, user's voice, control, status and switching data).

In one embodiment, the processor module is housed within an earpiece (e.g. cup of a circumaural or supra-aural earphone) of the earphone apparatus or provided as part of the cable for connecting the processor module to the server system (e.g. provided as part of an RJU connector forming one end of the cable or at a location along the cable between the RJU connector and earpiece).

In one embodiment, the earphone apparatus comprises an audio processing component.

In one embodiment, the earphone apparatus is configured to convert digital audio data received from the server system into an analogue sound output. In one embodiment, the audio processing component comprises a conversion function configured to covert the digital audio data into an analogue audio signal (e.g. for reproduction as an audible sound output by an electro-acoustic driver of the earphone apparatus).

In one embodiment, the earphone apparatus comprises at least one sensing microphone (e.g. one sensing microphone per ear) and the audio processing component comprises an Active Noise Cancellation (ANC) function for processing signals received from the at least one sensing microphone. The ANC function may implement feedback, feed-forward or hybrid feedback/feed-forward methods.

In one embodiment, the earphone apparatus comprises at least one sensing microphone (e.g. one sensing microphone per ear) for sensing ambient sound around the earphone device and the audio processing component comprises a monitoring (e.g. binaural monitoring) function configured to provide an audio signal based on sound measurements obtained from the at least one sensing microphone. In one embodiment, the monitoring function is configured to combine the sound measurements obtained from the at least one sensing microphone with an audio signal received from the server system.

In another embodiment, the audio processing component comprises a binaural synthesis function configured to synthesize a virtual binaural (virtual sound) reproduction from digital audio data provided by the server system.

In one embodiment, the processor module comprises a management component configured to receive control data from the server system. In one embodiment, the management component is configured to alter a configuration of the earphone apparatus in response to the received control data (e.g. alter control or audio processing settings such as filtering settings in an ANC program).

In one embodiment, the processor module comprises a status monitoring component configured to transmit status information from the earphone apparatus to the server system.

In one embodiment, the status monitoring component is configured to direct status information from the earphone apparatus to the server system in response to a status query received from the server system. In another embodiment the status monitoring component is configured to monitor the condition of the earphone apparatus and to provide a status report to the server system in the event of a change in condition (e.g. if a fault is identified). The status monitoring component may be further configured to identify and diagnose the fault condition of the earphone apparatus and provide fault information to the server system (e.g. in propriety or industry standard format such as BITE).

In one embodiment, the earphone apparatus includes a control switch or sensor for providing an input signal and the processor module comprises a control component is configured to transmit a digital control signal (e.g. corresponding to a programmed function) from the earphone apparatus to the server system in response to the input signal.

In one embodiment, the earphone apparatus comprises a microphone for detecting a user's speech and the processor module comprises a telephony component configured to digitize detected speech for digital transmission to the server system to allow for two-way voice communication.

In one embodiment, the processor module is programmable (e.g. a programmable microchip including a programmable software/firmware component).

In accordance with a third aspect of the present invention, there is provided a system for providing media and/or communications data to a plurality of users, the system comprising: a plurality of connection units (e.g. remote connection units) each comprising an electro-mechanical interface for connecting an earphone device to the system; and a server system for providing audio data to each of the plurality of connection units; wherein each connection unit comprises a processor module for allowing two-way digital communication between the connection unit and the server system.

In one embodiment, the system is an IFEC system and the connection unit is provided remotely from the server system (e.g. with one connection unit per passenger seat). The electro-mechanical interface may be configured to allow a user (e.g. passenger) to connect an earphone device to the server system when seated (e.g. the electro-mechanical interface may be provided on an armrest of a passenger's chair or anywhere else in the vicinity of the passenger's chair.

In one embodiment, the server system comprises a central server in communication with a plurality of local units acting as clients to the central server (e.g. local units (e.g. seating units in the case of an IFEC system) associated with a group of two or more users forming a sub-set of the plurality of users). In one embodiment, the central server and plurality of earphone devices are configured to allow direct digital communication therebetween. In another embodiment, the plurality of earphone devices are configured to communicate with the local units. For example, the plurality of earphone devices may be configured to communicate indirectly with the central server via a local unit connected between the central sever and an earphone device. In one embodiment the earphone devices may be configured to allow both direct communication with the central server and communication with the local units.

In one embodiment, the server system comprises a central server in communication with a plurality of local units acting as clients to the central server.

In one embodiment, each connection unit is associated with an identifier for allowing the server system to direct communications to a selected one of the plurality of connection units.

In one embodiment, the processor module of each connection unit comprises an audio processing component.

In one embodiment, the audio processing component comprises a conversion function configured to convert digital audio data received from the server system into an analogue audio signal.

In one embodiment, the audio processing component comprises an Active Noise Cancellation (ANC) function for processing signals received from at least one sensing microphone provided in a respective earphone device.

In one embodiment, the audio processing component comprises a monitoring function configured to provide an audio signal based on sound measurements obtained from at least one sensing microphone provided in a respective earphone device.

In one embodiment, the audio processing component comprises a binaural synthesis function configured to synthesize a virtual binaural reproduction from digital audio data provided by the server system.

In one embodiment, the processor module of each connection unit comprises a management component configured to receive control data from the server system.

In one embodiment, the management component is configured to alter a configuration of the connection unit or earphone device connected to the connection unit in response to the received control data.

In one embodiment, the processor module of each connection unit comprises a status monitoring component configured to direct status information from the connection unit to the server system.

In one embodiment, the status monitoring component is configured to direct status information from the connection unit to the server system in response to a status query received from the server system.

In one embodiment, the status monitoring component is configured to monitor the condition of the connection unit or earphone device connected to the connection unit and to provide a status report to the server system in the event of a change in condition.

In one embodiment, the status monitoring component is further configured to identify and diagnose the fault condition of the connection unit or earphone device connected to the connection unit and provide fault information to the server system.

In one embodiment, the processor module of each connection unit comprises a control component configured to transmit a digital control signal from the connection unit to the server system in response to an input signal (e.g. an input signal provided by means of a control switch or sensor provided on the connection unit or on a connected earphone device).

In one embodiment, the processor module includes a telephony component configured to digitize speech detected by a microphone (e.g. mounted in or on a respective earphone device) for digital transmission to the server system to allow for two-way voice communication.

In one embodiment, the processor module of each connection unit is programmable (e.g. to allow updating or upgrading of any of the components defined hereinabove).

In accordance with a fourth aspect of the present invention there is provided a connection unit comprising an electro-mechanical interface for connecting an earphone device to a server system comprising a processor module for allowing two-way digital communication between the connection unit and the server system.

In one embodiment, the system is an IFEC system and the connection unit is provided remotely from the server system (e.g. with one connection unit per passenger seat). The electro-mechanical interface may be configured to allow a user (e.g. passenger) to connect an earphone device to the server system when seated (e.g. the electro-mechanical interface may be provided on an armrest of a passenger's chair or anywhere else in the vicinity of the passenger's chair.

In one embodiment, the server system comprises a central server in communication with a plurality of local units acting as clients to the central server (e.g. local units (e.g. seating units in the case of an IFEC system) associated with a group of two or more users forming a sub-set of the plurality of users). In one embodiment, the central server and plurality of earphone devices are configured to allow direct digital communication therebetween. In another embodiment, the plurality of earphone devices are configured to communicate with the local units. For example, the plurality of earphone devices may be configured to communicate indirectly with the central server via a local unit connected between the central sever and an earphone device. In one embodiment the earphone devices may be configured to allow both direct communication with the central server and communication with the local units.

In one embodiment, the connection unit is associated with an identifier for allowing the server system to selectively direct communications to the connection unit.

In one embodiment, the processor module comprises an audio processing component.

In one embodiment, the audio processing component comprises a conversion function configured to convert digital audio data received from the server system into an analogue audio.

In once embodiment, the audio processing component comprises an Active Noise Cancellation (ANC) function for processing signals received from at least one sensing microphone provided in the earphone device.

In one embodiment, the audio processing component comprises a monitoring function configured to provide an audio signal based on sound measurements obtained from at least one sensing microphone provided in the earphone device.

In one embodiment, the audio processing component comprises a binaural synthesis function configured to synthesize a virtual binaural reproduction from digital audio data provided by the server system.

In one embodiment, the processor module comprises a management component configured to receive control data from the server system.

In one embodiment, the management component is configured to alter a configuration of the connection unit or earphone device connected to the connection unit in response to the received control data.

In one embodiment, the processor module comprises a status monitoring component configured to direct status information from the connection unit to the server system.

In one embodiment, the status monitoring component is configured to direct status information from the connection unit to the server system in response to a status query received from the server system.

In one embodiment, the status monitoring component is configured to monitor the condition of the connection unit or earphone device connected to the connection unit and to provide a status report to the server system in the event of a change in condition.

In one embodiment, the status monitoring component is further configured to identify and diagnose the fault condition of the connection unit or earphone device connected to the connection unit and provide fault information to the server system.

In one embodiment, the processor module comprises a control component configured to transmit a digital control signal from the connection unit to the server system in response to an input signal (e.g. by means of a control switch or sensor provided on the connection unit or on a connected earphone device).

In one embodiment, the processor module includes a telephony component configured to digitize speech detected by a microphone (e.g. mounted in a respective earphone device) for digital transmission to the server system to allow for two-way voice communication.

In one embodiment, the processor module is programmable (e.g. to allow updating or upgrading of any of the components defined hereinabove).

Figure 2:
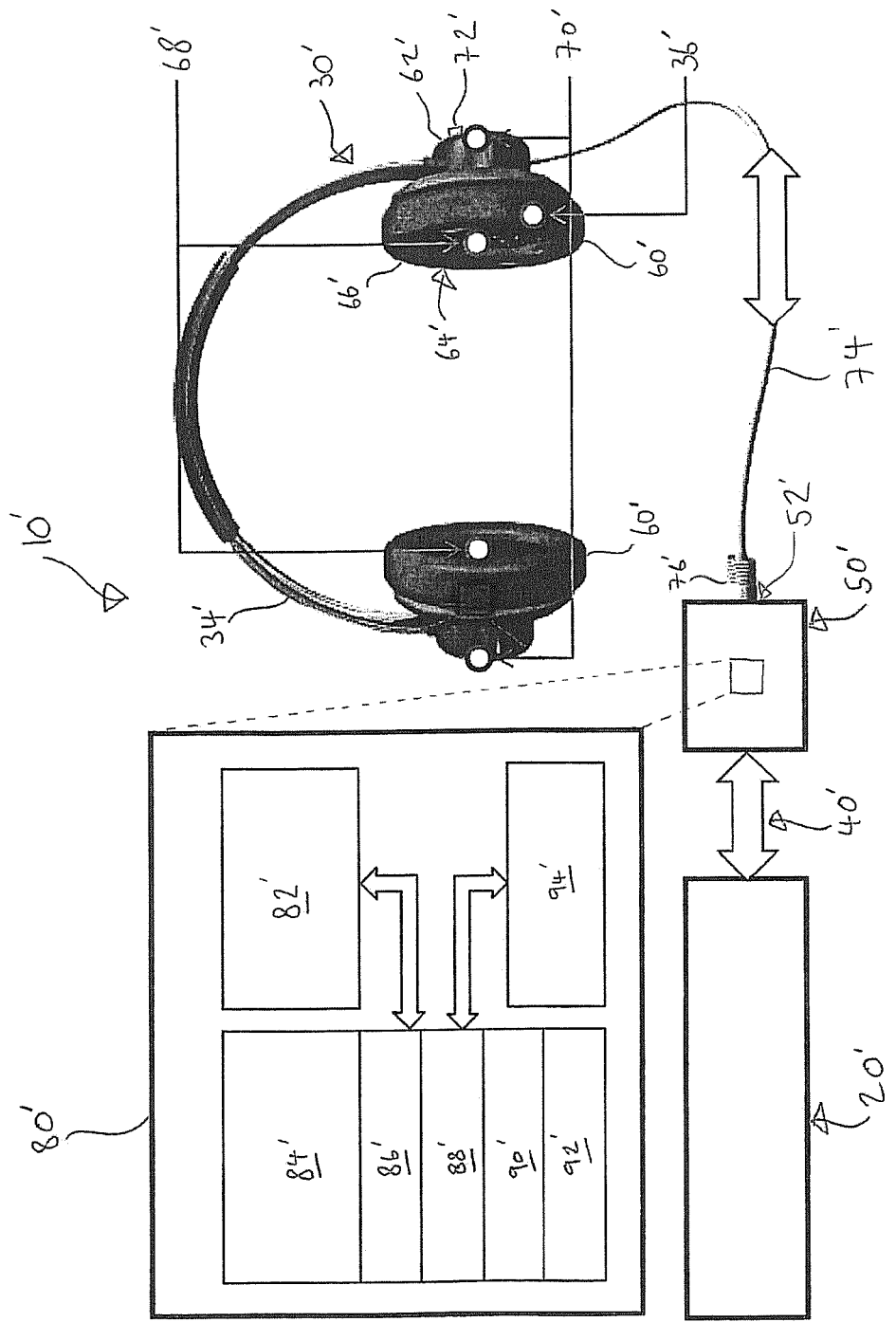

Embodiments of the present invention will now be described by way of example with reference to the accompanying drawings in which:

FIG. 1 is a schematic illustration of an IFEC system in accordance with a first embodiment of the present invention; and FIG. 2 is a schematic illustration of an IFEC system in accordance with a second embodiment of the present invention.

FIG. 1 shows an IFEC system 10 for providing media and/or communications data to a plurality of passengers onboard an aircraft. IFEC system 10 comprises a server system (or media source) 20 for supplying media data to a plurality of users. The media data includes audio data supplied to the users by means of a plurality of pairs of digital headphones (or digital headsets) 30 each coupled to the server system 20 by a wired digital communications link 40 via a respective RJU 50 mounted in an armrest of a passenger's seat or in another position in the vicinity of the passenger's seat. Server system 20 may comprise a central server in communication with a plurality of local units acting as clients to the central server (e.g. local units associated with a sub-set of the plurality of users and connected to each RJU 50 of the sub-set of users) or alternatively a central server in direct communication with each RJU 50.

Headphones 30 comprise a stereo pair of circumaural earphones 60 connected by a headband 34 and a microphone 36 for voice telephony. Each earphone 60 comprises: a body 62 housing an electro-acoustic driver 64; an ear cup 66 for surrounding a user's ear; an internal sensing microphone 68 for sensing sound within ear cup 66 for use in feedback ANC; an external sensing microphone 70 for sensing sound outside ear cup 66 for use in feed-forward ANC/binaural monitoring; and at least one control switch/sensor 72 for generating an input signal. A cable 74 with a connector 76 allows headphones 30 to be connected to RJU 50 via a connection jack 52 provided in RJU 50.

In addition to the features identified above, body 62 of one earphone 60 houses a programmable processor module 80 comprising the following upgradable functional components:

Digital communication component 82;
Audio processing component 84;
Feature set management component 86;
Status diagnosis component 88;
Telephony component 90;
Control component 92; and
Final stage audio input/output 94.

Digital communication component 82 is configured to allow two-way digital communication with server system 20 over digital communications link 40.

Audio processing component 84 is configured to provide a number of different audio functions including: 1) a conversation function for converting a digital audio signal received from server system 20 into an analogue audio signal; 2) an ANC function for running programmable electronics and software for feedback, feed-forward and hybrid ANC; 3) a binaural monitoring function based on sound measurements obtained from external sensing microphones 70; 4) a binaural synthesis function; and 5) an audio equalization function.

Feature set management component 86 is configured to manage operation of the processor module 80.

Status diagnosis component 88 is configured to monitor the status of headphones 30, identify and diagnose a fault condition of headphones 30 and providing fault information to server system 20.

Telephony function component 92 is configured to digitize speech detected via microphone 36 for digital transmission to server system 20 to provide two-way voice communication.

Control component 94 is configured to generate a digital control signal for server system 20 in response to an input signal received from the at least one control switch/sensor 72.

Final stage audio input/output 96 configured to drive electro-acoustic drivers 64/receive signals from microphones 36, 68, 70.

Digital communications link 40 is configured to maintain a reliable high speed digital communication between server system 20 and each set of headphones 30 to support the transportation of high definition stereo audio and wide band voice in combination with headset system setting and status and the uploading of software updates/upgrades. Full duplex communication necessary for real-time communications may be achieved by time division multiplexing of up-link and down-link communications. Control and status signals may also be time division multiplexed and may co-exist on the connection during voice/audio communications between headphones 30 and server system 20.

Server system 20 manages the transmission and receipt of digital audio, headset system settings and status via digital communications link 40 as well as providing passengers with a GUI to control audio content and functions.

Advantageously the IFEC system of the present invention offers the opportunity for improved sound quality (with audio signals being kept in the digital domain within enhanced immunity to interference along the signal path right up to the headphone), enhanced functionality and future proofing of headphones used on board commercial passenger aircraft.

Enhanced functionality includes methods of active noise cancellation where filters may be set by server system 20; binaural monitoring and binaural (virtual acoustic) processing where parameters may be set by via server system 20; status monitoring, fault diagnosis reporting to the server system 20 (potentially allowing headphones 30 to provide cabin crew with the ability to locate faulty headphones before they are discovered in use by passengers), and use of headphones 30 to perform programmed remote control functions via control component. Since the components for providing this enhanced functionality are provided in the form of upgradable software audio features and other capabilities may be readily updated or upgraded (e.g. as technology evolves) by uploading new features from server system 20 (e.g. globally to all headphones 30 in a single operation without any hardware modification of the headphones).

In accordance with one embodiment of the invention, each RJU 50 supports delivery of proprietary digital communication with appropriately configured digital headset devices (e.g. headphones 30) as well as supporting delivery of standard analogue audio to a conventional analogue headset including a standard 3.5 mm stereo analogue headphone interface (e.g. ARINC Type A1/B1 interface) on the same physical interface.

In use, when a headset device is connected to server system 20 via RJU 50 server system 20 attempts to connect to the headset digitally via a handshaking procedure. Server system 20 expects a response from a digital headset to its handshake inquiry within a predetermined period (e.g. 1.5 μs). If a positive response is received in this period the server system 20 maintains the digital connection. If a positive response is not received in this period the server system 20 assumes that a dumb analogue headset has been attached and switches its output to that headset from digital to analogue for as long as it senses current pull by the headset.

FIG. 2 shows an alternative IFEC system 10' for providing media and/or communications data to a plurality of passengers onboard an aircraft, comprising a server system (or media source) 20' for supplying media data to a plurality of users via a plurality of pairs of digital headphones (or digital headsets) 30' each coupled to the server system 20' by a wired digital communications link 40' via a respective RJU 50' mounted in an armrest of a passenger's seat or in another position in the vicinity of the passenger's seat (each RJU 50' being associated with a single set of headphones 30'). Server system 20' may comprise a central server in communication with a plurality of local units acting as clients to the central server (e.g. local units associated with a group of two or more users forming a sub-set of the plurality of users and connected to each RJU 50' of the users forming the group) or alternatively a central server in direct communication with each RJU 50'.

Headphones 30' comprise a stereo pair of circumaural earphones 60' connected by a headband 34' and a microphone 36' for voice telephony. Each earphone 60' comprises: a body 62' housing an electro-acoustic driver 64'; an ear cup 66' for surrounding a user's ear; an internal sensing microphone 68' for sensing sound within ear cup 66' for use in feedback ANC; an external sensing microphone 70' for sensing sound outside ear cup 66' for use in feed-forward ANC/binaural monitoring; and at least one control switch/sensor 72' for generating an input signal. A cable 74' with a connector 76' allows headphones 30' to be connected to RJU 50' via a connection jack 52' provided in RJU 50' and carries: a) analogue audio signals from the RJU 50' to electro-acoustic drivers 64' and b) signals from microphones 36', 68', 70' and at least one control switch/sensor 72' to RJU 50'.

Each RJU 50' a programmable processor module 80' comprising the following upgradable functional components:

Digital communication component 82';
Audio processing component 84';
Feature set management component 86';

Status diagnosis component 88';
Telephony component 90';
Control component 92'; and
Final stage audio input/output 94'.

Digital communication component 82' is configured to allow two-way digital communication with server system 20' over digital communications link 40'.

Digital communication component 82' is configured to allow two-way digital communication with server system 20' over digital communications link 40'.

Audio processing component 84' is configured to provide a number of different audio functions including: 1) a conversation function for converting a digital audio signal received from server system 20' into an analogue audio signal; 2) an ANC function for running programmable electronics and software for feedback, feed-forward and hybrid ANC based on sound measurements obtained from sensing microphones 68' and 70'; 3) a binaural monitoring function based on sound measurements obtained from external sensing microphones 70'; 4) a binaural synthesis function; and 5) an audio equalization function.

Feature set management component 86' is configured to manage operation of the processor module 80'.

Status diagnosis component 88' is configured to monitor the status of RJU 50' and headphones 30', identify and diagnose a fault condition of the RJU 50'/headphones 30' and providing fault information to server system 20'.

Telephony function component 92' is configured to digitize speech detected via microphone 36' for digital transmission to server system 20' to provide two-way voice communication.

Control component 94' is configured to generate a digital control signal for server system 20' in response to an input signal received from the at least one control switch/sensor 72'.

Final stage audio input/output 96' configured to drive electro-acoustic drivers 64'/receive signals from microphones 36', 68', 70'.

The invention claimed is:

1. A method for integrating a headphone device with a server system, comprising:
   initializing digital communications between the server system and the headphone device;
   based upon a success of said initializing the digital communications,
   receiving earphone status information from the headphone device via a two-way digital communication channel coupling the server system and the headphone device; and
   transmitting a digital audio signal to the headphone device via the digital communication channel for conversion into an analog audio signal for presentation; and
   based upon a failure of said initializing the digital communications,
   initializing analog communications between the server system and the headphone device; and
   transmitting an analog audio signal to the headphone device via the digital communication channel.

2. The method of claim 1, wherein said receiving the earphone status information comprises receiving the earphone status information in response to a status query transmitted by the server system or a change in condition of the headphone device.

3. The method of claim 1, wherein said receiving the earphone status information comprises receiving the earphone status information in a Built-In Test Equipment (BITE) format.

4. The method of claim 1, further comprising monitoring an operational status of the headphone device.

5. The method of claim 4, wherein said monitoring the operational status includes at least one of identifying a fault condition of the headphone device and diagnosing the fault condition, and wherein said receiving the earphone status information includes receiving information regarding the fault condition via the digital communication connection.

6. The method of claim 1, wherein said initializing digital communications comprises receiving a response within a predetermined time after transmitting a handshake inquiry from the server and otherwise initializing the analog communications.

7. The method of claim 6, further comprising maintaining the digital communications or the analog communications between the headphone device and the server system as long as the headphone device draws current from the digital communication connection.

8. The method of claim 1, further comprising repeating said initializing the digital communications after said initializing analog communications.

9. The method of claim 8, further comprising, based upon a success of said repeating,
   receiving the earphone status information from the headphone device via the two-way digital communication channel; and
   transmitting the digital audio signal to the headphone device via the digital communication channel for conversion into the analog audio signal for presentation.

10. The method of claim 8, further comprising, based upon a failure of said repeating, maintaining the analog communications between the server system and the headphone device.

11. The method of claim 1, wherein said initializing the digital communications includes initializing an audio processing component of the headphone device for converting the transmitted digital audio signal into the analog audio signal for presentation via an earphone of the headphone device.

12. The method of claim 11, wherein said initializing the audio processing component comprises initializing the audio processing component to convert the transmitted digital audio signal based upon ambient sound measured via a sensing microphone of the headphone device or using Active Noise Cancellation based upon signals received via the sensing microphone.

13. The method of claim 11, wherein said initializing the audio processing component comprises initializing the audio processing component to synthesize a virtual binaural reproduction from the transmitted digital audio signal.

14. The method of claim 1, further comprising, based upon the success of said initializing the digital communications, transmitting a control signal for altering a selected headphone operation to the headphone device via the digital communication channel.

15. The method of claim 1, further comprising, based upon the success of said initializing the digital communications, receiving a control signal from a control component of the headphone device via the digital communication channel based upon activation of a control switch of the headphone device or a control sensor of the headphone device.

16. The method of claim 15, further comprising altering a selected server operation of the server system in response to the received control signal.

17. The method of claim 1, further comprising, based upon the success of said initializing the digital communications, receiving a control signal from a control component of the headphone device via the digital communication channel based upon activation of a control switch of the headphone device or a control sensor of the headphone device.

18. The method of claim 1, further comprising, based upon the success of said initializing the digital communications, receiving a digitized speech signal from a telephony component of the headphone device via the digital communication channel based upon audible speech detected by a microphone of the headphone device.

19. A headphone device, comprising:
 a headband; and
 an earphone apparatus being coupled with said headband and including a status monitoring component for providing earphone status information to a server system via a two-way digital communication channel and an audio processing component for converting a digital audio signal received from the server system via the digital communication channel into an analog audio signal for presentation by said earphone apparatus,
 wherein said earphone apparatus when in communication with the server system, enables the server system to initialize digital communications with said earphone apparatus, and, based upon successfully initializing the digital communications, receives the digital audio signal and otherwise receives an analog audio signal from the server system via the digital communication channel.

20. A system for providing media content, comprising:
 a server system; and
 a connection unit being coupled with the server system and being configured to communicate with a headphone device,
 wherein the server system initializes digital communications with the headphone device via said connection unit, and, based upon successfully initializing the digital communications, transmits a digital audio signal to the headphone device via a digital communication channel for conversion into an analog audio signal for presentation and otherwise transmits an analog audio signal to the headphone device via the digital communication channel.

* * * * *